United States Patent [19]

Bach

[11] 4,091,119

[45] May 23, 1978

[54] METHOD FOR UNIFORM HEATING OF A FOODSTUFF FOR PRESERVATION AND APPARATUS THEREFOR

[76] Inventor: Jean Bach, 19, Waldstrasse, Grafelfing, Germany, D-8032

[21] Appl. No.: 794,521

[22] Filed: May 6, 1977

[30] Foreign Application Priority Data

May 13, 1976 Germany .............................. 2621312

[51] Int. Cl.² ................................................ A23L 3/00
[52] U.S. Cl. .................................... 426/234; 426/237; 426/241; 426/577
[58] Field of Search ............... 426/234, 237, 241, 577; 219/10.55 R, 10.55 M, 10.55 F

[56] References Cited

U.S. PATENT DOCUMENTS

| | | | |
|---|---|---|---|
| 2,485,660 | 10/1949 | Robertson | 219/10.81 X |
| 2,823,293 | 7/1974 | Gilliatt | 219/10.81 X |
| 2,838,640 | 6/1958 | Mann et al. | 219/10.81 X |
| 3,261,140 | 7/1966 | Long et al. | 426/234 |
| 3,974,355 | 8/1976 | Bach | 219/10.55 A |

*Primary Examiner*—Jeanette M. Hunter

*Attorney, Agent, or Firm*—Gilbert L. Wells; Heinrich W. Herzfeld

[57] ABSTRACT

A foodstuff is located in a container open at its top end in which ambient gas (air) occupies the space inside the container above the product. The container is immersed into a liquid having a low dielectric loss factor, such as water, to such an extent that the liquid level is somewhat below the upper side of the product in the container. Using electrodes located to either side of the container, there is passed through the container from one side thereof to the other a first high-frequency electromagnetic alternating field having a respective first frequency such that the penetration depth of said first field is at least as great as the width of the container. From the open end of the container at which the air filled portion thereof is located, there is passed into the container through the air and into the adjoining portion of the product a second high-frequency electromagnetic alternating field having a respective second frequency such that the penetration depth of the second field is small compared to the penetration depth of the first field.

27 Claims, 1 Drawing Figure

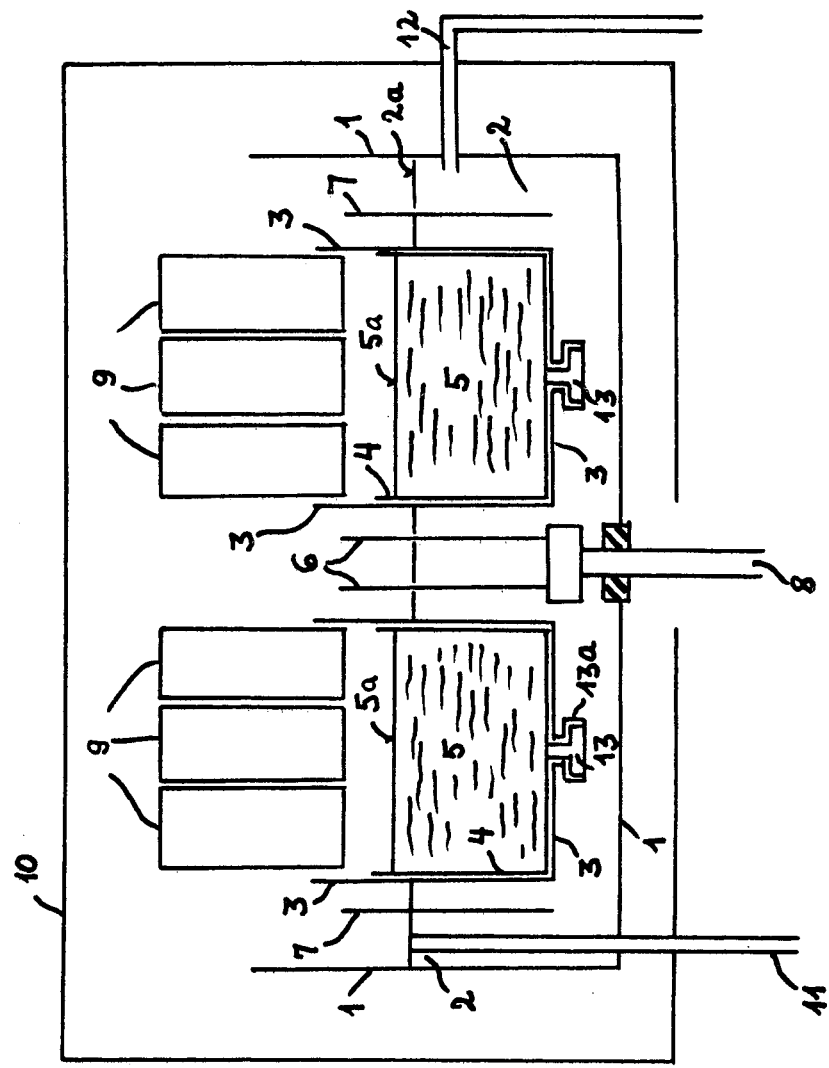

METHOD FOR UNIFORM HEATING OF A FOODSTUFF FOR PRESERVATION AND APPARATUS THEREFOR

BACKGROUND OF THE INVENTION

The invention relates to a process for uniform heating, in particular for the purpose of preserving, of organic products (e.g. foodstuffs which are filled into a container or a plurality of containers which are permeable for alternating electromagnetic fields, the container or containers being introduced, up to slightly below the level of the top surface of the foodstuff in the container, into a liquid having a suitable dielectric constant and having a low loss factor tan δ and an adjustable temperature, whereupon the containers and the foodstuff present therein are exposed to an electromagnetic high-frequency field which acts on the foodstuff from opposite sides through the liquid and through the walls of the container or containers, the containers and the foodstuff present therein being irradiated from above by an electromagnetic ultrahigh-frequency field. Such process has been described in U.S. Pat. No. 3,974,355, which requires that the containers are closed at the top, the space above the top level of the goods being filled with a gas, e.g. air.

During uniform heating, in particular for stabilizing or preserving water-containing foodstuffs, problems arise especially if the foodstuff is not completely homogeneous with respect to the dielectric loss factor tan δ, such as is approximately the case with yoghurt. Further problems arise if the foodstuff has been introduced for the said treatment in packages which are not completely closed.

The above-mentioned prlbems arise in particular in the treatment (whenever "treatment" is mentioned this is always to be understood as a uniform heating, in particular for stabilizing or preserving water-containing foodstuffs) of jams which still contain whole fruit which, during the treatment, are to be preserved more or less completely as whole fruit. The deviations in the tan δ values are to be understood, still in the above example, in the sense that in a jam the dielectric loss factor tan δ of fruit juice with added sugar differs from that of fruit pieces or entire fruit also present in the jam.

In the conventional heat preservation of foodstuffs by using infrared radiation or contact heat, a deterioration in the quality of the peripheral layers of the goods is almost unavoidable, in the case of packaged foodstuff, as the result of heating to excessive temperatures or for excessive periods. Unpackaged foodstuffs, however, can be brought more or less accurately to the desired average temperature level, and kept there, by constant stirring during the heating process. This advantage is, however, frequently accompanied by the drawback that the mechanically less resistant components of the foodstuff, for example strawberries in a jam, are damaged or even pulped during stirring. The more viscous or pasty the foodstuff, the more this drawback manifests itself.

Since however, the quality of a jam is assessed, e.g., by the number of largely undamaged fruit contained therein, stirring can easily entail a significant reduction in the market value of the jam.

The fruit preserve industry is thus continually searching for a balance between the damage due to overheating and the damage due to stirring. A further problem of this industry is the filling of the treated, sterilized foodstuff into small containers without the risk of reinfection with bacteria or bacterial spores during the filling process if, to save costs, the foodstuff had been prepared and stabilized in containers holding large quantities.

OBJECTS AND SUMMARY OF THE INVENTION

It is a primary object of the invention to extend the scope of applicability of the process described in U.S. Pat. No. 3,974,355 and, in particular, to make it possible to treat foodstuffs by this process even in larger batches. It is also an object of the invention to eliminate the above-mentioned drawbacks which result from overheating of individual portions of the foodstuff or from the necessity of stirring. In particular, it is an object of the invention to reliably stabilize jams, marmalades or jellies, such as are to be used, for example, for admixture to dairy products, such as yoghurt without any damaging or crushing of whole fruit or relatively large pieces of fruit contained therein, during the treatment.

According to the invention, this is achieved when, an organic preserve (fruit of all types and/or berries and optionally additives, admixed thereto, for the purpose of influencing their flavor, odor, appearance or maintaining quality and consistency of the foodstuff) is filled into containers with an open top end up to a level slightly below their upper rim and are then subjected to the treatment with the alternating electromagnetic fields.

According to the invention, it is thus no longer necessary to enclose the foodstuffs in completely closed containers for treating them in alternating electromagnetic fields. It suffices to introduce the foodstuffs to be treated into containers with an open top. The influence of the high-frequency field acting from the side is limited upwards by the level of the liquid into which the containers are introduced. As already explained in detail in my U.S. Pat. No. 3,974,355, this is necessary in order to prevent flash-overs (undesirable discharges which may cause perforation of the container wall). For this purpose, the liquid level is kept below the top surface of the foodstuff so that there are no sudden changes of the dielectric constant in the field. In many cases, the top surface of the foodstuff to be treated will be uneven because of its viscous or pasty form, such as is the case, for example, with jams and marmalades. The ultrahigh-frequency field acting from above serves to treat this topmost layer of the foodstuff. The treatment of the foodstuff can be carried out in containers having an open top as, due to the syrupy or pasty consistency of the goods, there is no danger of mixing top and intermediate or bottom layers after the treatment. Thus, an infection of the parts of the foodstuff which are not open to the surroundings also cannot take place. This is especially the case if the foodstuffs to be treated are sugar-containing marmalades, jams or gellies which, after stabilization or preservation, will keep stable in any case, after the treatment, due to their inherent sugar content. In the case that fruit of all types and/or berries to be treated are initially present in the frozen state, it is advantageous to raise the temperature of the foodstuff first to ambient temperature by other types of heating, for example by adding heated syrup. The foodstuff is then subjected to the treatment according to the invention only after it has been brought to ambient temperatures uniformly throughout the foodstuff.

With regard to the type of liquid, its dielectric constant, its dielectric loss factor and its temperature, the description thereof in U.S. Pat. No. 3,974,355 is incorporated in the instant application by reference.

Preferably, the frequency of the high-frequency field is provided sufficiently low so that, for the foodstuff to be treated, the depth of penetration of the field in a direction approximately perpendicular to the electrodes is greater than the width of the container in that direction (first alternating field). This is important in order to achieve uniform heating through the entire thickness of the foodstuff to be treated between the two high-frequency electrodes. If necessary, additional electrical measures can be taken in order to provide, by an appropriate arrangement of the electrodes and the surroundings, that a uniform quantity of electrical energy is converted into heat at every point in the foodstuff to be treated between the high-frequency electrodes.

The frequency of the ultrahigh-frequency (second) field is selected to be substantially higher than that of the (first) high-frequency field. This has the advantage that, on the one hand, the depth of penetration of the ultrahigh-frequency field is essentially restricted to that part of the foodstuff which is not covered by the high-frequency field and, on the other hand, use is still made of the advantage of ultrahigh-frequency fields that virtually no flash-overs occur, such as usually take place under non-optimum conditions with high-frequency fields of the high field strengths required here for the arrangement described.

A particular difficulty in treating foodstuffs results if the upper surface thereof is very uneven due to relatively large undamaged fruits which partly protrude from the surface or due to the very viscous consistency of the foodstuff. In any case, it is necessary to prevent the presence of air gaps or gas gaps in the path of the high-frequency field, the upward extent of which is determined by the height of the liquid level, since these gaps give rise to undesired discharges. If the surface of the foodstuff to be treated is very uneven, the liquid level must be kept sufficiently low so that it is still below the lowest upper surface regions of the foodstuff. Thus, considerable differences in height between the highest and lowest upper surface regions of the foodstuff can occur. If the differences between the highest and lowest surface regions of the foodstuff to be treated are relatively large, the frequency of the ultrahigh-frequency field must be reduced in order to ensure the greater depth of penetration, which is then necessary, down to the region treated by the high-frequency field (first field).

Preferably, the containers for the foodstuff to be treated have at least approximately rectangular or cubic cross-sections. As a result of this, the layer thickness of the foodstuff to be treated is approximately equal everywhere between the high-frequency electrodes so that a uniform heating of the foodstuff during the treatment can be achieved. To achieve an automation of the high-frequency or ultrahigh-frequency energy supplied, it has proved advantageous to run the containers through the treatment zone not as discrete units but as a virtually uninterrupted chain of containers, virtually no free space being present between the containers as viewed in the conveying direction. The ideal in this respect is a virtually endless container which, for example, can be formed by an endless conveyor belt, the lateral regions of which are bent upwards in the region of the treatment zone so that the cross-section, transversely to the conveying direction, of the endless belt has approximately the shape of a U in the region in which it is loaded with foodstuff to be treated.

To prevent a reinfection of the foodstuff being treated, as far as possible, the treatment is carried out in an atmosphere which is as low in bacteria as can practically be ensured.

As already explained further above, sugar-containing marmalades, jams and jellies which have been stabilized by the process according to the invention are virtually free from any danger of perishing in regions which are not exposed to the ambient air. It is essentially the sugar content of these foodstuffs which maintains their food qualities stable. Marmalades, jams or jellies of this type are liable to be reinfected exclusively at the surface. If, after the treatment according to the invention, such marmalades, jams or jellies are filled into small packages, such as, for example, marmalades jars or plastic beakers, it is sufficient, after closing containers of this type with a lid or closure which is permeable for electromagnetic waves, to subject these small containers to an after-treatment with an ultrahigh-frequency field on their upper surface which is accessible to the air in the air-filled head space inside the container. In this way, the treatment of the foodstuff filled into small packages can be carried out very rapidly and economically.

Small packages and their lids which are to be used in conjunction with the above-mentioned process and for which a synthetic plastics material is customarily chosen as the container material and lid material, are usually joined by heat-sealing or, less frequently, by welding. In the former case, a layer of sealing lacquer which joins the two parts to one another under a corresponding pressure and temperature is applied either to the rim of the container or to the lid. When using appropriately selected types of plastics material, welding can be accomplished in a similar manner—but of course without heat-sealing lacquer.

The materials customarily selected for the lid, for the container and for the heat-sealing lacquer have only low dielectric losses and, for this reason, they are also only slightly warmed in the ultrahigh-frequency field radiated in from above. Difficulties result, however, from the fact that, due to the high filling speed conventional in industry, it is unavoidable that droplets or splashes of the product stick onto the rim of the container. The solid constituents thereof remain as residues which interfere with sealing and are aligned horizontally flat, at right angles to the ultrahigh-frequency irradiation, between the plastic material surfaces which are to be sealed to one another and disturb the contact of the heat-sealing lacquer with the two plastic material surfaces.

In order to prevent reliably an inadmissibly strong heating in the zone of the seal seam between the lid and the container, caused by the irradiation with the ultrahigh-frequency field, but without affecting or even preventing the effectiveness of the process in heating the upper layers of the product or the air-filled head space present in the container above its contents, another feature of the invention provides that the containers which preferably have the largest cross-section at their top side, in the zone of the opening of the container, always have a rim which is angled outwards and on each of which a lid is fixed, after the main treatment according to the invention, by means of hot-sealing or welding and that, at least for the duration of the subsequent after-treatment by ultrahigh-frequency irradiation, the zone in which the container and the lid are joined together is screened against the ultrahigh-frequency field.

This selective screening, on the one hand, does not impede the desired heating of the product close to its surface, and of the headspace in the container as well as of the particles of product and the bacteria in this headspace, by the ultrahigh-frequency field but, on the other hand, undesired heating up of the region of the joint seam between the lid and the container, as a consequence of the ultrahigh-frequency irradiation, is effectively prevented by the selective screening of that region, whereby the stress resistance of the joint seam between the lid and the container remains unimpaired by the ultrahigh-frequency irradiation.

Of course, the screening can be carried out in various ways but, according to the invention, it must always meet the two demands already mentioned, namely that, on the one hand, an ultrahigh-frequency irradiation of the joint seam present between the lid and the container is prevented and, on the other hand, the ultrahigh-frequency irradiation, coming from above, of the top surface of the product and of the headspace also enclosed in the container is not impeded.

According to a preferred embodiment, screening is effected by applying to the lid a mask of relatively thin metal or a self-adhesive layer having a satisfactory radiation-absorbing metal content. This can be accomplished either by applying a metal foil or the like, in the form of a corresponding template which only covers the joint seam itself, to the lid or between the layers of a lid composed of several films, or it is also possible to provide the lid in the zone of the joint seam on its top surface or between the lid layers with a metal-containing coating. in a preferred mode, the metal-containing layer can be printed on, in which case several successive printing steps may be necessary in order to achieve the metal content which is required for the aforesaid purpose. For example, printing can be carried out as colour printing using a metal powder—preferably aluminum—as the pigment, the metal content of the imprint and hence the degree of screening being adjusted by multiple printing.

The process according to the invention can be automated by measuring the temperature of the foodstuff to be treated immediately before and after the treatment with the electromagnetic fields and automatically determining the field energy to be supplied as a function of the difference between the two values and the difference between the actual value and the set value of the temperature after the treatment with the alternating electromagnetic fields, and automatically supplying the corresponding amount of field energy.

BRIEF DESCRIPTION OF THE DRAWING

The invention shall now be explained in more detail in connection with a preferred embodiment illustrated in the accompanying drawing, U.S. Pat. No. 3,974,355 being additionally incorporated herein by reference with respect to the disclosure of the present invention.

The single FIGURE shows schematically a treatment device according to the invention in a section transversely to the conveying direction.

DETAILED DESCRIPTION OF THE EMBODIMENT SHOWN IN THE DRAWING

A tank or trough 1 is filled, up to a level 2a, with a liquid 2, for example water, having an adjusted dielectric constant $\epsilon$ and having a low loss factor tan $\delta$. Water having these properties can be obtained, for example, by careful purification. In the tank or trough 1, two guide elements 3 constituting channels are provided, each of which forms a guide for a successive row of containers 4, which are open at the top. Each row of containers 4, only one of which per row is shown in the drawing in cross-sectional view, is moved through its respective channel 3 in a direction perpendicular to the plane of the drawing. Each container is charged up to a level 5a with foodstuff 5 to be treated therein. The walls of the channels 3 and likewise the walls of the containers 4 are manufactured from a material which is permeable to alternating electromagnetic fields and has a low dielectric loss factor tan $\delta$; these walls are manufactured preferably from a suitable synthetic plastics material. Polytetrafluoroethylene, e.g. the product marketed as Teflon or Hostaflon is a suitable material for this purpose.

Each of the containers 4 has the shape of an oblong, and in each row of containers 4 passing through the respective channel 3, the containers are in contact with one another, the rear end face of a preceding container being in contact with the forward end face of the next following container, so that virtually no free space remains between the frontal faces of successive containers. In practice, each container may be, for instance, 30 cm wide, 25 cm high and 45 cm long.

In the walls of the channels 3, perforations (not shown) are provided which permit an exchange of the liquid 2 in the trough 1. This design of the channels 3 virtually completely eliminates the formation of undesired waves in the trough 1.

Adjacent to the channels 3, high-frequency electrodes 6 and 7 are located in the liquid 2 in the trough 1, the inner electrodes 6 which are connected to the high-frequency generator via a line 8 being the live electrodes and the electrodes 7 being the grounded electrodes. The electrodes reach downwards to approximately the underside of the containers 4 and preferably end slightly above the underside of the containers 4 and, on the other hand, protrude upwards beyond the level of the liquid. Paraboloid ultrahigh-frequency radiators 9 are located above the container 4.

The entire treatment installation is accommodated in a Faraday cage 10 in order to prevent electromagnetic waves from reaching the surroundings. The containers 4 are conveyed through the channels 3 with the aid of plastic belts 13 which are guided in guide tracks 13a below the underside of the channels 3. The liquid is fed from the trough 1 through an overflow pipe 11 to a purification unit and is recycled from the latter via a feedline 12 into trough 1. At the same time, the height of pipe 11 is adjustable and serves to set the liquid level in the trough 1.

The containers 4 in a row, the front faces of which are in contact with one another or interlock, form together one elongated container which takes up the total length of the treatment space or can even exceed the length of the latter. Before they enter into the treatment stations equipped with the high-frequency electrodes 6 and 7 and the paraboloid ultrahigh-frequency radiators 9, the containers 4 are continuously and uniformly charged with the foodstuff 5 up to the specific set filling level 5a, in such a way that the foodstuff 5 forms a layer of predetermined thickness which reaches from one side wall of the container 4 to the other and always covers the entire bottom of the container, it being necessary to take care that the layer contains no air and gas inclusions and, if necessary, such inclusions are eliminated by shaking or the like. If a relatively even surface of the foodstuff does not form by itself on its topside after filling, the evenness of the surface of the foodstuff can be further improved by smoothing it mechanically. The containers 4 are then passed through the treatment space at a constant speed which can be regulated from a gearbox (not shown).

The level 2a of the liquid 2 present in the tank 1 is always set to be a little lower than the surface level 5a of the foodstuff 5 in the containers 4. Preferably, the liquid level should be about 6 to 10 mm below the surface of the foodstuff 5 in the containers 4. If the surface of the foodstuff is uneven, the liquid level should be lowered yet further. If necessary, the difference between the surface of the foodstuff and the liquid level below the former can, for example, be up to 18 mm in the case of certain jams, when an ultrahigh-frequency field of 2450 megacycles is used. This difference can be up to 35 mm, if an ultrahigh-frequency field of 915 megacycles is used.

The alternating electromagnetic field existing between the high-frequency electrodes 6 and 7 extends through the channels 3, the containers 4 and the foodstuff 5 and is delimited upwards by the liquid level 2a. The upper layers of the foodstuff to be treated, which are not reached by the high-frequency field, and also the air-filled space present above the foodstuff, are treated by means of the ultrahigh-frequency field from above through the open top of the containers 4.

The throughput speed depends on the tan $\delta$ value of the foodstuff and on the available generator power. To control the temperature, it has proved simpler in practice to vary the power of the electric generators than to vary the throughput speed of the container 4.

In industrial operation, the foodstuffs are delivered for treatment at different temperatures; the deviations from the envisaged standard can be up to 15 centigrades or more. In the case of certain types of foodstuff, the end temperature of the foodstuff to be treated, which must be adhered to after treatment in order to achieve the purpose of the treatment, lies within a relatively narrow temperature range with a tolerance of about $\pm 6$ centigrades. In order to reach an end temperature after treatment within the particular permissible tolerance range, the particular quantity of energy which is to be supplied is controlled as a function of the delivery temperature and the desired end temperature. Infrared sensors can be provided to continuously transmit the value of the initial temperature of the foodstuff to an appropriately programmed electronic computer, to which the end temperatures after treatment are also fed by a second infrared sensor from the other end of the installation. In accordance with these two data, the computer meters the quantity of energy supplied by means of the two fields so that the end temperature of the treated foodstuff always remains within the permissible relatively narrow tolerance range of the end temperature. If the inlet temperature is so low that the energy available from the high-frequency or ultrahigh-frequency generators is insufficient to reach the desired end temperature at a predetermined speed, the computer emits an alarm signal and switches off the treatment installation. The generator power is selected so that the computer still has sufficient scope for compensating the fluctuations, which are customary in practice, of the delivery temperature of the foodstuff to be treated.

The passage through the installation described completes the stabilization of mass products which are intended for further processing in industry, for example of jams for the dairy industry which are used for the manufacture of yoghurt preparations and cream cheese preparations having a fruit taste, since the material is filled into sterile tanks under precautions which exclude a reinfection, and is transported to the customers in these tanks.

The foodstuff which has been stabilized in the manner described can also be used for packaging in portions into small units by introducing it into appropriate small containers using filling installations suitable for this purpose. The filling installation need not work "aseptically"; it suffices if the storage tank of such a station, its filling pumps and its feed-lines are kept low in bacteria content since most of the foodstuffs for which the process can be used are very rich in sugar and hence are poor breeding grounds for bacteria. However, they are the more susceptible to mould-producing fungi.

During the actual filling process, the foodstuff comes into contact with the ambient air between the end of the filling spout and the container, so that reinfection becomes possible. Since, however, the bacteria which may be present are aerobic, they can develop only on the surface of the foodstuff. If the small container—which, in a special case, can also be manufactured from a metal—is now covered with a film which is permeable to electromagnetic waves or with a lid of this type and is then subjected again to an after-treatment in an ultrahigh-frequency field which is radiated in from above and has a sufficiently high energy to destroy the bacteria which may also have been enclosed on the surface of the foodstuff and in the headspace of the package which may be present, a well preserved small package can thus be produced.

This last-mentioned ultrahigh-frequency field can have a frequency which is identical or similar to that which was used in the main stabilization process but—depending on the desired depth of penetration and on other features—it can also have one of the other frequencies approved for industrial use.

This preferred arrangement of an apparatus working in accordance with the invention has a treatment space with an open top and a horizontal passage. Many other arrangements are possible amongst which only those may be mentioned here which have treatment spaces with a downward gradient in the direction of movement of the goods—up to a tube in a vertical position, with a circular, oval or rectangular cross-section—and in all of which conveying of the foodstuff through the treatment space could be accomplished more easily, in some cases even automatically utilising gravity. Nevertheless, the horizontal arrangement is to be preferred because the elimination of occluded air enclosed in viscous or pasty material is still most readily accomplished in this arrangement. If necessary for this purpose, the installation can be preceded by a short shaking feeder.

Amongst the manifold possibilities of eliminating occluded air in treatment spaces with a gradient, a conically tapering feed path of about 35° inclination toward the horizontal plane affords the best results.

This can also be used in the preferred arrangement for increasing and further stabilizing the layer thickness of the foodstuff being conveyed.

EXAMPLE

A jam prepared from frozen strawberries and sugar as well as the usual ingredients is to be sterilised. It is known that it is infected—via the fruit—with yeast cells, mould spores and Escherichia coli. The fruit is thoroughly rinsed with water before preparing the jam.

The jam is delivered for treatment at a mean temperature of about 38° C. Since it is to be heated to 75° to 80° C, the $\Delta t$ value is about 40° on average.

The end temperature which is to be adhered to is set to 76° to 79° on the controller of the electronic computer, the liquid 2 is heated to about 50° and its level is brought to the normal height, that is to say to about 10 to 12 mm below the set level of the surface of the jam 5 to be treated, by appropriately setting the overflow pipe 11.

When the availability signal has been received from the generators, the liquid circulation pumps, the conveying device and finally the feed device for the goods are switched on. The mutually joined, product-filled containers 4 of each row are set in motion by the chain belt 13. The jam 5 filled into the containers 4 from the dispenser initially does not lie flat in the containers; for this reason, it is pressed into the correct position by means of a surface-shaping device conventional in the industry.

Since the computer at the start receives only the inlet value, the treatment of the first filling in the installation is unreliable. It is branched off at a point provided for this purpose and returned to the dispenser where its temperature equilibrates with that of the much larger quantity stored there.

Even during the course of the treatment, the surface of the jam is not completely level: individual fruits can protrude or leave holes. For this reason a frequency of relatively deep penetration, namely 915 megacycles, was selected also for the ultrahigh-frequency energy radiated in via the paraboloid radiators 9, whilst the high-frequency field between the electrodes 6 and 7 has a sufficient depth of penetration at a frequency of 27.12 megacycles.

After a passage time of about 5 minutes, nearly 1.5 minutes of which are accounted for by the treatment itself, a product is obtained at an average temperature of 78° C with a maximum deviation of a little less than 1 centigrade.

A bacteriological test indicated sterility.

The installation described here is suitable for small and medium firms. However, installations for a larger output can also be constructed, even though the emitter electrode cannot be lengthened indefinitely. It is designed as a twin electrode installation with two adjacent treatment spaces. In this model, the grounded electrodes are on the outside of the treatment spaces.

A part of the jam treated in this way was introduced, immediately after the treatment described above had ended, into a sterile tank which could serve as the storage tank of a filling installation. The jam did not come into contact with the atmosphere during this transfer. The parts of the filling installation which come into contact with the jam had beforehand been reduced to a very low content of bacteria, for example by flushing with steam. The jam was filled in the conventional manner, i.e. while in contact with the ambient air, into small round aluminum dishes of about 10 mm depth and about 40 mm diameter. The small dishes were then sealed with lids consisting of synthetic plastics material and, since the temperature had fallen to about 55° C in the meantime, the dishes were again heated to a surface temperature of the contents of almost 80° C by means of ultrahigh-frequency irradiation. An ultrahigh-frequency field having a frequency of 2450 megacycles was used therefor.

The jam portions treated in this way proved to be free from mould and yeast and withstood storage at room temperature for more than 6 months.

Compared with known types of treatment, the treatment according to the invention has the further advantage that lower maximum temperatures (about 80° instead of about 100°) and shorter times, during which the material is kept warm are sufficient for stabilizing.

To achieve an even finer dosification of the high-frequency and ultrahigh-frequency energy supplied by the computers, it is possible separately to determine the initial temperatures and end temperatures in the parts of the foodstuff to be treated, which are to be influenced or have been influenced by the high-frequency field and the ultrahigh-frequency field.

I claim:

1. In a method for effecting a uniform heating, particularly for the purpose of preserving of an organic product located in a container in which a gas occupies the space inside the container above the product, and comprising the steps of immersing the container into a liquid having a low dielectric loss factor to such an extent that the liquid level is somewhat below the upper surface of the product in the container, using electrodes located to either side of the container to pass through the container from one side to the other a first high-frequency electromagnetic alternating field having a respective first frequency such that the penetration depth of said first field is at least as great as the width of the container; from that side of said container at which the gas filled portion thereof is located, passing into the container through the gas and into the adjoining portion of the product a second high-frequency electromagnetic alternating field having a respective second frequency such that the penetration depth of the second field is small compared to the penetration depth of the first field, the improvement consisting of that end of said container at which the space being occupied by a gas is located, being the top end of said container and being open, said second high-frequency electromagnetic alternating field being introduced through said open top end of said container.

2. The improvement as described in claim 1, wherein the gas in said gas-filled space is ambient air.

3. The improvement as described in claim 1, wherein said organic product is a foodstuff.

4. The improvement as described in claim 3, wherein said foodstuff contains sugar in a bacterial growth-inhibiting concentration.

5. The improvement as described in claim 4, wherein at least a major portion of said foodstuff is of pasty or syrupy or gel consistency.

6. The improvement as described in claim 5, wherein said foodstuff is a jam or jelly and contains pieces of fruit or whole fruits.

7. The improvement as described in claim 6, wherein the top surface of the foodstuff in the container is uneven, and wherein the frequency of the second field is held the smaller, the greater the unevenness of the top surface of said foodstuff.

8. The improvement as described in claim 7, wherein said liquid level is below the lowermost region of said uneven top surface of said foodstuff in said container.

9. The improvement as described in claim 1, wherein said first field has a frequency such that the penetration depth of said first field is at least as great as the width of the container irradiated therewith.

10. The improvement as described in claim 9, wherein said first frequency is between about 1 MHz and about 300 MHz, and wherein said second frequency is between about 300 MHz and about 5 GHz.

11. The improvement as described in claim 10, wherein said first frequency is 13.56 MHz.

12. The improvement as described in claim 10, wherein said first frequency is 27.12 MHz.

13. The improvement as described in claim 10, wherein said second frequency is 433 MHz.

14. The improvement as described in claim 10, wherein said second frequency is 915 MHz.

15. The improvement as described in claim 10, wherein said second frequency is 2450 MHz.

16. The improvement as described in claim 2, wherein said organic product is a foodstuff, and, wherein the air in said space is held at a low bacteria content, throughout and after the treatment with said electromagnetic fields until the container is closed.

17. The improvement as described in claim 16, further comprising the step of closing the open top end of said container, after the treatment with said electromagnetic fields, hermetically with a lid means of a material permeable to the waves of said second field.

18. The improvement as described in claim 17, further comprising the step of irradiating said foodstuff in said container, after hermetically sealing the latter with said lid means, by said second field at such frequency that the electromagnetic waves of said second field penetrate through said lid means and through the uneven top surface of said foodstuff to the lowermost part of the latter surface.

19. The improvement as described in claim 18, further comprising the step of screening the portion of said lid means which is hermetically, sealingly joined to said container against said second field.

20. The improvement as described in claim 19, wherein said screening is effected by superimposition or insertion of a metal-containing layer in said portion of said lid means.

21. The improvement as described in claim 19, wherein the screening is effected on said lid means at a distance in radial direction of at least 1 mm from the periphery of the open end of said container outwardly.

22. An apparatus for effecting a uniform heating, particularly for the purpose of preserving of an organic product located in a container having an open top end in which an ambient gas occupies the space inside the container above the product, comprising, in combination, a tank containing a liquid having a low dielectric loss factor; transporting means for transporting a plurality of such containers in end-to-end sequence into and then out of said liquid and for holding the containers in the liquid immersed to such an extent that the liquid level is somewhat below the upper surface of the product in the containers; first field generating means operative for passing through a container located at a predetermined position in said tank from one side of such container to the other a first high-frequency electromagnetic alternating field having a respective first frequency such that the penetration depth of said first field is at least as great as the width of the containers transported by said transporting means; second field generating means operative for passing through the open top end of a container located at a predetermined position in said tank from above the container a second high-frequency electromagnetic alternating field transverse to said first field and having a respective second frequency greater than said first frequency and such that the penetration depth of said second field corresponds approximately to the depth of the part of the product which is located above the liquid level in said tank during penetration of said container by said first field.

23. An apparatus as described in claim 22, wherein each of said containers is of oblong shape, a plurality of said containers being in end-to-end contact with each other on said transporting means.

24. An apparatus as described in claim 22, wherein said container is of cubic shape.

25. An apparatus as described in claim 22, wherein said container consists of an endless belt having sidewalls extending in the direction in which said container is moved past said first and second fields and being provided at least in a zone of said endless belt charged with said organic product to be treated, upward from the bottom of said belt.

26. An apparatus as described in claim 22, wherein said transporting means comprise guide means in said tank and constituting channels for guiding said containers therethrough and comprising lateral walls having perforations which permit an exchange of liquid between the outside and the inside of said channels.

27. The improvement as described in claim 1, further comprising measuring the temperature of said organic product immediately prior and immediately subsequent to the treatment thereof by means of said first and second fields, determining the difference between these temperatures, determining the difference between the actual temperature value after the said treatment and a set temperature point for the last-mentioned temperature, and automatically controlling the field energies for generating said first and second fields as a function of the aforesaid two differences.

* * * * *